(12) United States Patent
Svehaug

(10) Patent No.: US 7,431,165 B1
(45) Date of Patent: *Oct. 7, 2008

(54) LIQUID/SOLIDS WASTE SEPARATOR

(76) Inventor: Henry Svehaug, 114 SW. 5th, Milton-Freewater, OR (US) 97852

( * ) Notice: Subject to any disclaimer, the term of this patent is extended or adjusted under 35 U.S.C. 154(b) by 407 days.

This patent is subject to a terminal disclaimer.

(21) Appl. No.: 11/313,440

(22) Filed: Dec. 19, 2005

Related U.S. Application Data

(63) Continuation-in-part of application No. 10/793,085, filed on Mar. 4, 2004, now Pat. No. 6,976,592.

(51) Int. Cl.
B01D 29/01 (2006.01)
B01D 29/05 (2006.01)
B01D 29/68 (2006.01)

(52) U.S. Cl. .................. 210/411; 210/413; 210/499
(58) Field of Classification Search ............. 210/411, 210/413, 499
See application file for complete search history.

(56) References Cited

U.S. PATENT DOCUMENTS

| | | | | |
|---|---|---|---|---|
| 3,357,567 A | * | 12/1967 | Wake | 210/408 |
| 3,864,249 A | * | 2/1975 | Wallis | 210/785 |
| 4,261,831 A | * | 4/1981 | Linsenmeyer | 210/391 |
| 4,412,920 A | * | 11/1983 | Bolton et al. | 210/409 |
| 4,437,982 A | * | 3/1984 | Wasson | 209/5 |
| 4,468,325 A | * | 8/1984 | Yock et al. | 210/408 |
| 4,661,253 A | * | 4/1987 | Williams | 210/411 |
| 5,259,955 A | * | 11/1993 | Bolton | 210/406 |
| 5,425,876 A | * | 6/1995 | Rector | 210/354 |
| 5,462,673 A | * | 10/1995 | Piers | 210/739 |
| 5,470,472 A | * | 11/1995 | Baird et al. | 210/391 |
| 6,186,340 B1 | * | 2/2001 | Hirs | 210/411 |
| 6,354,442 B1 | * | 3/2002 | Obst | 210/353 |

* cited by examiner

Primary Examiner—Thomas M Lithgow
(74) Attorney, Agent, or Firm—Richard D. Clarke

(57) ABSTRACT

A liquid/solids waste separator apparatus for use in separating animal waste or waste water into filtered liquid and collected solid particles. It has an elongated housing having a pair of support legs attached to the rear end of the housing for varying the inclination angle of the housing. Positioned downwardly from the top edge of the housing is an elongated mesh screen that extends substantially the length of the housing. A plurality of nozzles are laterally spaced from each other and connected to the top of a spray tube that extends transversely beneath the mesh screen. A separate slide pad supports each of the opposite ends of the spray tube and they travel along their respective tracks formed on the inner surface of the respective right and left side walls of the housing beneath the mesh screen. An electric motor drives a chain passing around a pair of longitudinally spaced sprocket gears in the housing. A pin extends upwardly from the chain and it is captured by a travel block that travels transversely in a guide track assembly. This allows the spray tube to reciprocally travel back and forth beneath the mesh screen and the nozzles produces a water knife spray against the bottom surface of the mesh screen to unclog any apertures in the mesh screen that have become clogged. Part of the filtered liquid is recycled by a pump connected to a fluid line leading to the respective nozzles. Waste particles that do not pass through the mesh screen are collected 3in containers placed adjacent the front end of the housing.

15 Claims, 4 Drawing Sheets

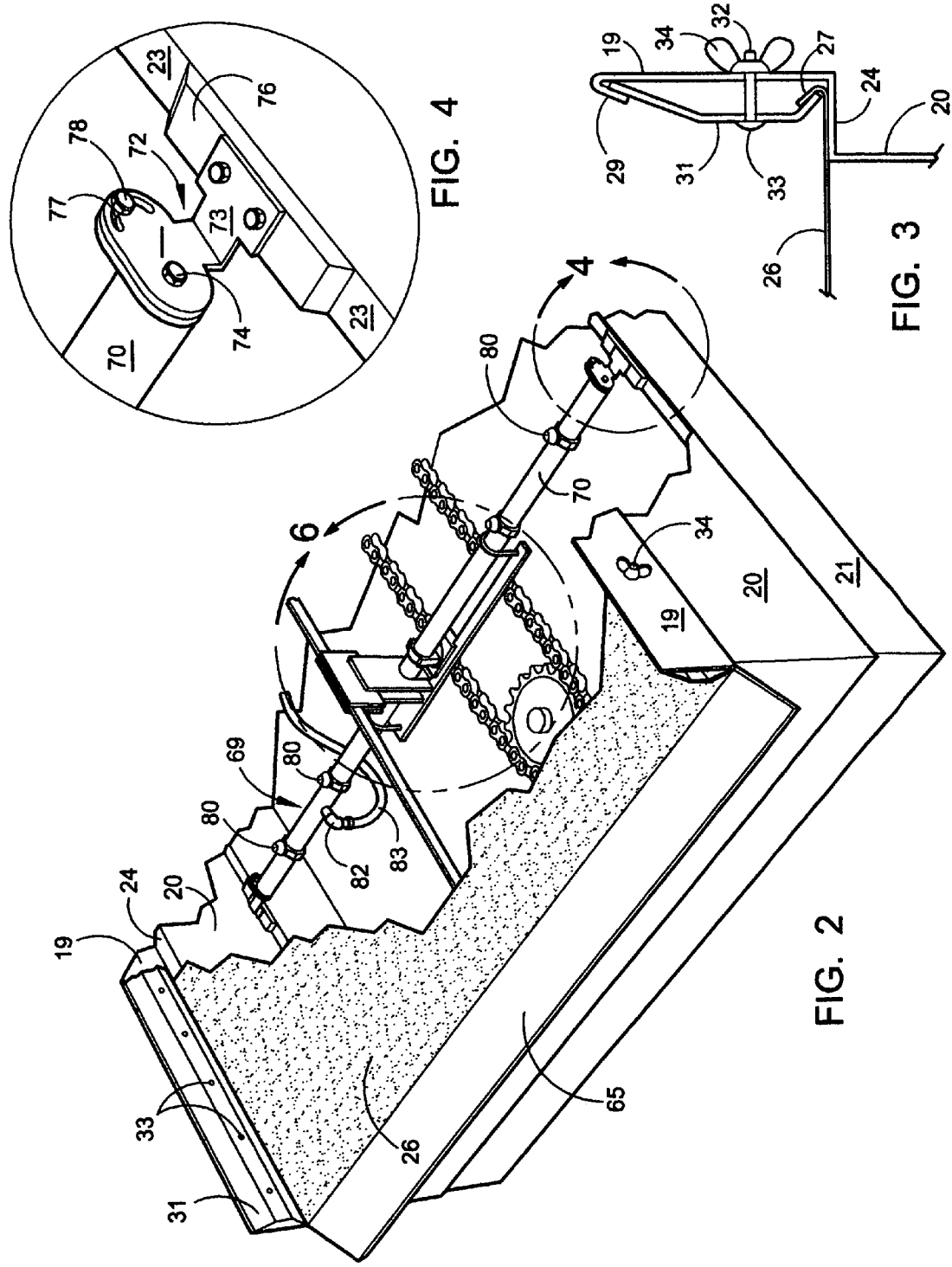

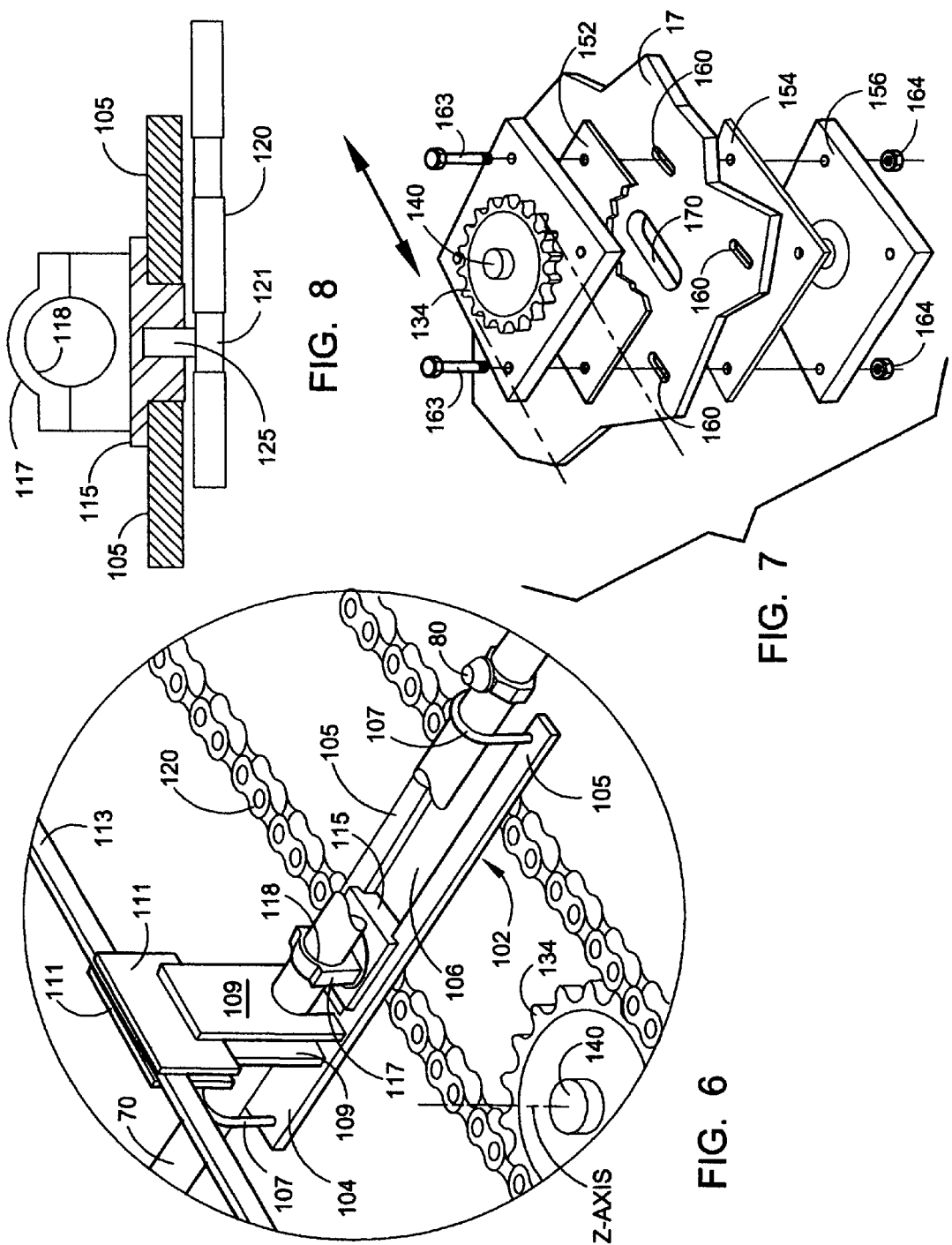

LIQUID/SOLIDS WASTE SEPARATOR

This application is a continuation-in-part of U.S. patent application Ser. No. 10/793,085 filed Mar. 4, 2004 now U.S. Pat. No. 6,976,592.

BACKGROUND OF THE INVENTION

The invention relates to a filtration device and more specifically to a liquid/solids waste separator. The liquid/solids waste separator apparatus has been specifically designed for separating animal waste into filtered liquid and collectable waste particles. The apparatus works especially well for filtering the manure of livestock and hogs by farmers but it could have other applications.

Examples of several prior art patents will be discussed below.

The Hanselmann U.S. Pat. No. 3,607,399 is directed to a method and apparatus for cleaning screen drums in textile machines. In operation, referring to FIGS. 1 and 4, the cleaning roll 10 and drive roll 11 are arranged inside the screen drum 3 with the drive roll 11 to the left of the cleaning roll 10 for a rotation of the screen drum 3 in a counter clockwise direction. The fins 13 on the cleaning roll 10 are inclined in the direction of the screen drum rotation. Upon rotation of screen drum 3, drive roll 11 rotates in the same direction due to the friction of its rubber surface on the interior surface of screens 5. Drive roll 11, due to its frictional contact with the fins 13 on the cleaning roll 10, drives the cleaning roll 10 in a opposite clockwise direction. A carrier air stream then transports the fiber material 1 via the feed duct 2 to the outer surface of screen 5 of the rotating screen drum 3. The air stream then flows through the perforations 4 into the interior space of screen drum 3 while the fiber material is deposited on the outer surface of screen 5. At the same time, the fins of the rotating cleaning rolls remove any tangles that form in the perforations 4 or at other places on the interior surface of the screen. The fiber material removed after passing a line of frictional contact between the drive roll and cleaning roll is then carried away from the inside by the carrier air stream which passes through screen 5 and exits via an exhaust duct (not shown) at the uncovered end of the screen drum. An alternative embodiment uses a plurality of balls to replace the cleaning roll and the drive roll.

The Black et al U.S. Pat. No. 3,656,493 is directed to a screen washing apparatus with an enclosure cabinet having screen loading means extending between the exterior and the interior of the cabinet. The cabinet contains a washing gun support means advanceable across the area of the screen by controlled bi-directional movement to interrelated conveyance means, one in one dimension and one in the other dimension transversely thereto, the one having a sweeping movement and the other an incremental advancement. Lighting means is arranged to allow visual inspection upon completion of the washing cycle, through access doors. The washing gun is removable from its support means for manual washing of any local areas.

The Mikolajczyk U.S. Pat. No. 3,855,118 is directed to a device for washing and retaining representative drilled formation cuttings such as customarily obtained for analysis in oil field drilling operations. The washing device is used in the following manner. The lid 17 is raised and the cage door 27 is slid to the left out of position. The operator thereupon places the well cutting samples to be washed within the foraminous cage assembly 20, closing the various access doors to initiate washing. The water control valve 36 is then opened as well as the drain valve 26, and the screen assembly 20 rotates by virtue of a hand crank assembly 40 during which time the well cutting samples are continually agitated and tumbled within the cage assembly 20. The perforations 25 within the oblong tube members 24 are preferably positioned such that the resulting stream is directed at the well cutting samples. Screen 20 and access door 27, together with its related appurtenances, is fabricated of brass or bronze.

The DeLoach U.S. Pat. No. 4,682,613 is directed to apparatus for cleaning loose fill media, and more particularly to apparatus for cleaning loose fill media of the type used in aeration, de-gassification, odor control and air stripping towers. It has a foraminated cylindrical container mounted on a platform for rotation at a relatively slow speed. A portion of the container passes through a pan containing a liquid solvent of the particular type useful in removing the containment which has filed the medium. A first pump is provided to transfer this liquid from the pan to a storage tank. A second pump delivers liquid at high pressure to be sprayed on the media. A hoist raises one end of the container to facilitate the unloading of the cleaned media.

The Rohm et al U.S. Pat. No. 4,705,055 is directed to apparatus for automatically cleaning extrusion screens in juice finishing machines and the like. The automatic cleaning apparatus 50 includes a cleaning assembly or wash ring 52 comprising a tubular horseshoe-portion 54 extending generally circumferentially about the cylindrical screen 14 in the region between screen 14 and housing 12. Cleaning assembly 52 is also provided with a plurality of nozzles 56 which are supplied with cleaning fluid from the tubular horseshoe-shaped portion 54. Cleaning assembly or wash ring 52 is supported about the periphery of a cylindrical screen by mounting brackets 62 and 64. Brackets 62 and 64 are in turn slidably mounted on V-shaped tracks 66 and 68 so that the entire cleaning assembly or wash ring 52 is capable of reciprocating lateral movement with respect to cylindrical screen 14.

The MacFarlane U.S. Pat. No. 5,400,812 relates to apparatus and a method of cleaning textile printing screens. Cleaning apparatus 10 comprises pump house 11, an enclosed wash tank 12 and a loading unit 13, supported on the framework. The pump house is arranged to deliver high pressure water to an internal screen cleaning nozzle arrangement 14 and a ring-shaped external screen cleaning nozzle 15. The nozzle arrangements 14, 15 are arranged in a gap 19 between a screen support skid 16 and an entry screen support skid 17. The screen support skid 16, the entry screen support skid 17 and loading skid 18 include a semi-circular recess substantially the same diameter as that of a cylindrical printing screen to be cleaned. Skids 16,17 and 18 are thereby arranged to support the cylindrical printing screen during passage into and from the apparatus 10.

The Lithander U.S. Pat. No. 5,549,759 is directed to a tube or pipe cleaning apparatus in which a rotatable conveyor drum is mounted within a container. The drum periphery is formed with pipe-receiving pockets, where a high pressure solution is simultaneously sprayed over and within the pipes to clean them.

The Cord et al U.S. Pat. No. 5,769,956 is directed a screen cleaning apparatus that includes an enclosed housing which forms a cleaning chamber having a plurality of spraying nozzles positioned therein to spray a printing screen with a cleaning solvent. An oscillating mechanism is mounted within the cleaning chamber to move the screen in an oscillating motion in front of the spray nozzle to provide an efficient and effective cleaning of the printing screen.

The Nanjyo et al U.S. Pat. No. 5,860,361 is directed to a screen plate cleaning station having nozzles discharging a cleaning liquid to clean a screen plate which has been set in place, the station comprising a hood-like cleaning zone setting means which are provided on both sides of the screen plate in such a manner that their extremities are in contact with both surfaces of the screen plate, thereby defining substantially equal cleaning zones on both sides to prevent the cleaning liquid discharge from the nozzles from scattering.

The Foster et al U.S. Pat. No. 6,129,099 is directed to a pallet washing apparatus and method. The apparatus includes a main housing having a conveyor system on which articles are transported into and through a washing chamber. A plurality of high pressure, jet-stream spray nozzles rotating at high speeds are supplied with a high pressure wash fluid. The spray nozzles provide rapid powerful, knife-like jet streams of wash fluid which impact the surface of the articles moving through the washing chamber repeatedly to lift and blast off contaminants adhered to the articles.

The Cord et al U.S. Pat. No. 6,174,382 B1 is directed to a printing screen cleaning and reclaiming apparatus comprising a cleaning device defining a cleaning and reclaiming path and a plurality of low pressure-high volume water wash off stations, in series, along the path. An ink degradient, an emulsion remover, and a degreaser are each applied successively along the path, and an ink removal station, an emulsion removal station, and a degreaser removal station are positioned successively along the path to provide the low pressure-high volume water wash off.

The Tani U.S. Pat. No. 6,234,080 B1 is directed to apparatus for cleaning screens used in screen printing machines for printing of solder paste onto a surface of a printed circuit board.

It is an object of the invention to provide a novel liquid/solids waste separator having an elongated mesh screen to filter solids from liquids that have already passed through one or more separators.

It is also an object of the invention to provide a novel liquid/solids waste separator apparatus for filtering cattle and hog waste effluent.

It is another object of the invention to provide a novel liquid/solids waste separator apparatus that self cleans its filtering screen thereby reducing or eliminating downtime normally required to clean the screen.

It is an additional object of the invention to provide a novel liquid/solids waste separator apparatus that recycles filtered liquid to be used by the high pressure spray nozzles used to blast solid waste particles off the filtration screens thereby elimination the need for a separate water source.

It is also an object of the invention to provide a novel liquid/solids waste separator having an elongated stainless steel screen whose openings can be kept clear by high pressure waste water without abrasive wear on the screen.

It is another object of the invention to provide a novel liquid/solids waste separator mounted in an adjustable frame so that the angle of the separator housing can be varied to control flow of the effluent over the separator's elongated screen.

It is a further object of the invention to provide a novel liquid/solids waste separator that has full time cleansing that is accomplished by a traveling spray bar under the screen passing parallel to the screen at a regular rate.

SUMMARY OF THE INVENTION

The liquid/solids waste separator is used to separate solid waste particles from farm animal effluent or industrial processing of waste water. Prior to passing the effluent through the novel liquid/solids waste separator, the effluent has been passed through one or more separators.

The separator utilizes a fine mesh screen and it has been designed so that it can operate continuously without the necessity of closing down or stopping the operation of the system in order to clean particles out of the mesh.

The liquid/solids waste separator has an elongated housing having a front wall, a rear wall, a left side wall, a right side wall and a bottom wall. A 200 mesh or larger stainless screen has its lateral edges secured to the inside surface of the respective side walls. The afore mentioned structure provides a flow channel for effluent to pass there over. The separator has support legs for positioning the housing so that its rear end is higher than its front end. The support legs may be adjusted with respect to the housing at different heights to vary the angle of inclination with the horizontal and the angle is in the range of 25-60 degrees. The angle range of 35-38 degrees appears to be optimal.

An effluent overflow tank is mounted adjacent the rear end of the housing and it has a spreader box pan that directs the overflow from the tank to the top end of the screen where it is evenly deposited thereon. The effluent travels downwardly over the top surface of the screen with liquid passing through the screen's apertures to a filtered liquid collection chamber in the bottom of the housing. Solid waste particles travel downwardly over the top surface of the screen and some of them become trapped in the apertures of the screen. A continuously traveling spray assembly is positioned below the screen. It has a manifold tube with spray nozzles thereon. The opposite ends of the manifold tube have UHMW slide pads connected thereto that travel on tracks on the inner surface of the left and right side walls. The spray assembly has a travel block connected to a drive peg that is rigidly secured to a closed loop chain. The chain is driven continuously around a pair of longitudinally spaced sprocket gears driven by an electric motor. As the drive peg passes around the respective sprocket gears, the travel block is pulled transversely in the slot of the guide track assembly so that its travel is continuous. Full time cleaning of the screen is accomplished by the traveling spray assembly that is moving at a timed rate under the screen. The timing can be adjusted. The effect is that on the uphill travel of the spray assembly, the underneath spray frees any particles caught in the apertures of the screen. On the downhill travel of the spray assembly the freed particles are flooded downwardly off the bottom end of the screen.

The liquid passing through the apertures of the screen is so clear that a portion of it can be utilized to be pumped through the spray nozzles without clogging the nozzles. The cleaning of the screen is thus constant occurring using the clean water that has been recovered. The apparatus is very simple and should have a long life since there is no vibration to it. The apparatus reduces the present load on our waste processing systems.

An added benefit of the separator is that the filtered liquid that has been collected can be profitably sold as fertilizer for trees, shrubs, etc.

DESCRIPTION OF THE DRAWINGS

FIG. 2 is a partial front perspective view of the elongated housing showing portions broken away;

FIG. 3 is an enlarged side elevation view showing the manner in which the mesh screen is secured to the respective side walls of the elongated housing;

FIG. 4 is an enlarged view taken along circular line 4 in FIG. 2;

FIG. 6 is an enlarged view taken along circular line 6 in FIG. 2;

FIG. 7 is an exploded front perspective view of the structure utilized to properly tension the chain; and FIG. 8 is a schematic side elevation view showing the manner in which the travel block is secured to the drive chain.

DESCRIPTION OF THE PREFERRED EMBODIMENT

Figure 1:
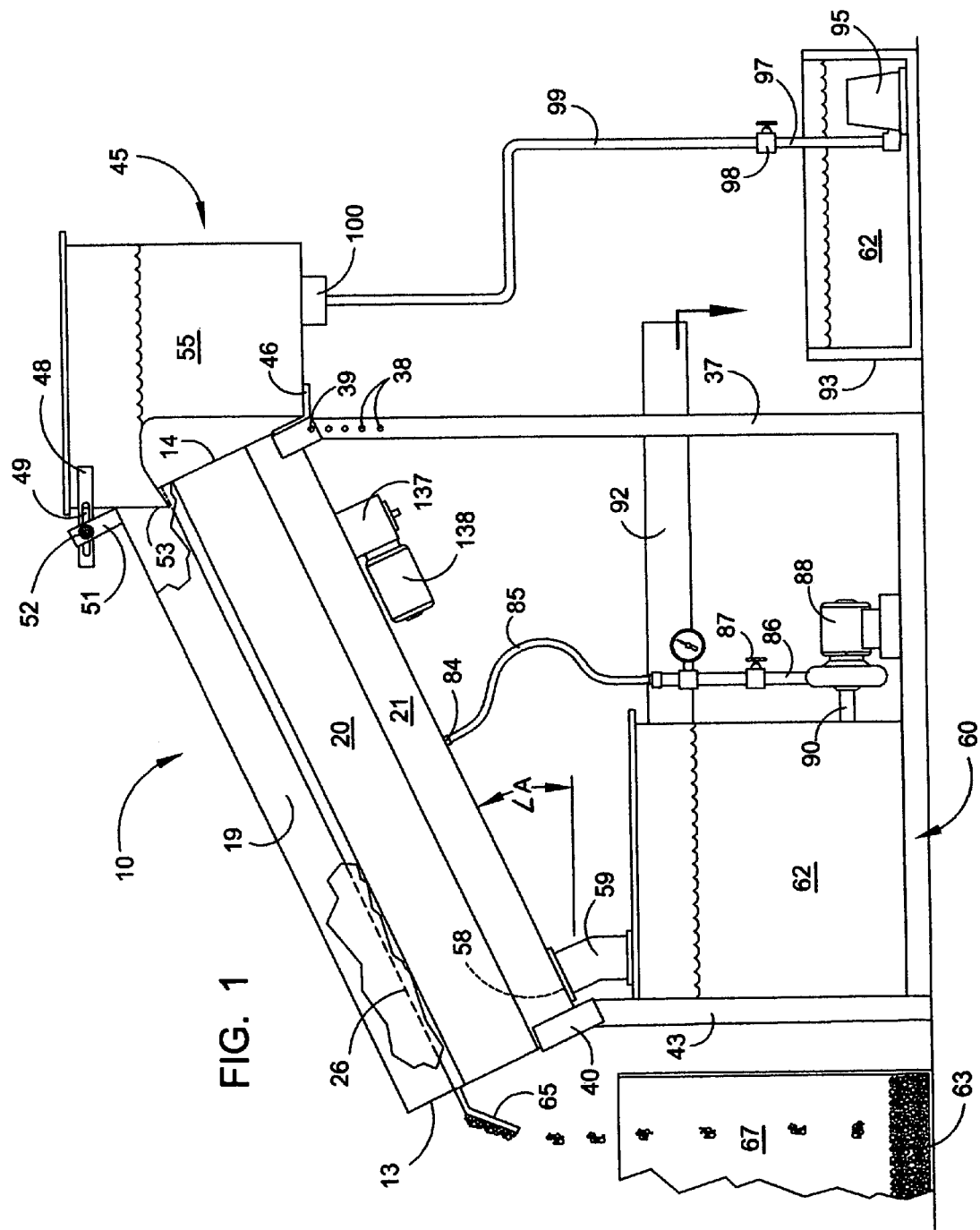
FIG. 1 is a schematic side elevation view of the liquid/solids waste separator assembly that includes an effluent overflow tank.

The liquid/solids waste separator will now be described by referring to FIGS. 1-8 of the drawings. The liquid/solids waste separator is generally designated numeral 10. It has an elongated housing 12 having a front wall 13, a rear wall 14, a left side wall 15, a right side wall 16, a bottom wall 17 and a longitudinally extending X-axis.

The elongated housing 12 is preferably made of stainless sheets that are assembled together. The left and right side walls have similar structure but only the left side wall will be discussed. Left side wall 15 has three distinct portions. There is the upper side wall portion 19, the middle side wall portion 20 and the lower side wall portion 21. These portions have been created by lower step 23 and upper step 24 formed on the inner surface of left side wall 15. Lower step 23 also functions as a track and will be discussed later. Upper step 24 provides a support structure for the left edge of mesh screen 26. Screen 22 is preferably made of stainless steel having a 200 mesh or larger screen. Its lateral edges have a flange or lip 27. Left side wall 15 has a hook tip 29 extending downwardly. A locking strip 31 has its top edge captured by hook-shaped tip 29 and its bottom end captures flange or lip 27 of the stainless steel screen 26. The bolt 32 having a head 33 passes through aligned apertures in the locking strip 31 and left side wall 15. A wing nut 34 is used to tighten the assembled structure together and rigidly secure screen 26. The combined structure of the two locking strips 31 and mesh screen 26 forms a flow channel for effluent having solid particles therein that would travel downwardly over the mesh screen. Screen 26 has a length L1 and a width W1. L1 is in the range of 4-10 feet. W1 is in the range of 16-72 inches. Mesh screen 22 is positioned approximately 5-16 inches above bottom wall 17. The waste separator has been tilted at an angle A and angle A is in the range of 25-60 degrees. The rear end of housing 12 has a pair of laterally spaced support legs 37 attached to the respective left and right side walls 15 and 16. There are a plurality of apertures 38 vertically spaced along the top end of the respective legs 37 so that the rear end of housing 12 can be attached thereto by bolts 39 at various heights. Pivot brackets 40 are secured to the front end of the respective left and right side walls 15 and 16 for pivotal attachment to the top end of front support legs 43.

An effluent overflow tank 45 is supported by a pair of brackets 46. Adjacent the top end of effluent overflow tank 45 is a bracket 48 having a slot 49. A bracket 51 extends upwardly from the rear end of housing 12 and has a bolt or pin 52 that travels through and is locked in slot 49. A spreader box pan 53 extends forwardly from the front end of effluent overflow tank. When the level of the effluent 55 rises to a predetermined height, it overflows and spreader box pan 53 distributes the effluent across the width of mesh screen 26. As the effluent travels down the top surface of mesh screen 26, the liquid portion passes through the apertures in mesh screen 26. Solid waste particles either accumulate on top of the screen or partially enter the apertures of the screen. The liquid portion of the effluent passes downwardly into a collection chamber 57 in the bottom of housing 12. This liquid passes through an outlet port 58 and then through a discharge pipe 59 into a reservoir tank 60 filled with filtered liquid 62. The waste particles 63 that are flushed down the top of mesh screen 26 drop off the flange or lip 65 into a waste discharge bin/container 67.

The spray assembly 69 is best illustrated in FIGS. 2 and 6. It has an elongated manifold tube 70 that spans the width of housing 12. Each end of manifold tube 70 has an L-shaped bracket 72 detachably secured thereto. Each L-shaped bracket 72 has a horizontal portion 73 and a vertical portion 74. Horizontal portion 73 is secured by bolts to a slide pad 76 made of ultra high molecular weight (UHMW) material. Vertical portion 74 has an arcuate groove 77 with a bolt 78 passing therethrough and having a nut secured to its rear end. When bolts 78 and 79 are loosened, manifold tube 70 can be rotated through a small range of degrees to change the angle at which the spray nozzles will be directing their flow toward the bottom surface of the mesh screen. As the slide pad is drive upwardly and downwardly along the lower step track 23, it will scrape off any accumulation of dirt or debris that has settled or formed thereon.

A plurality of spray nozzles 80 are connected to the outer surface of manifold tube 70. A swivel connector 82 has its one end connected to the interior of manifold tube 70 and its other end connected to hose 83. Hose 83 is connected to a swivel connector 84 in the bottom wall 17 of housing 12. Swivel connector 84 is in turn connected to a supply hose 85 that passes downwardly through fluid line 86, control valve 87 and electric pump 88. The supply of water for spray assembly 69 starts in the water reservoir tank 60. The filtered liquid 62 is drawn through a fluid line 90 into pump 88 and delivered upwardly through the previously detailed structure into the interior of manifold tube 70. When the filtered liquid 62 in water reservoir 60 raises to a predetermined level, it will pass outwardly through overflow pipe 92 and spill into a tank 93. If there is not a sufficient amount of effluent 55 in effluent overflow tank 45, pump 95 will be actuated to pump filtered liquid 62 up through pipe 97, valve 98, pipe 99 and inlet port 100. Normally there would be a full flow of effluent being delivered through a pipe into the top of effluent overflow tank 45.

The guide track assembly 102 is supported from manifold tube 70. It has a plate 104 having a pair of longitudinally extending laterally spaced legs 105 that form a slot 106 between them. Plate 104 has a transversely extending Y-axis. U-shaped clamps 107 pass upwardly over the top of manifold tube 70 with their opposite ends being secured to the respective plate 104 and legs 105. A pair of laterally spaced support brackets 109 have their bottom edges secured to the top surface of plate 104. A tracking plate 111 is welded to the inner surface of the respective support plates 109. The inner surface of the tracking plates 111 have a sheet or layer of plastic material (UHMW) thereon to minimize friction on the tracking rail 113. Tracking rail 113 has its front end connected to front wall 13 and its rear end connected to rear wall 14.

A nylon or (UHMW) travel block 115 is positioned in slot 106 for reciprocal travel there along. An alignment bearing block 117 is secured to the top surface of travel block 115. Alignment bearing block 117 has a bore 118 that allows manifold tube 70 to pass freely therethrough. Chain 120 has a chain connector link 121 having a drive peg or pin 123 welded to its top end. Drive peg 123 is received in a bore hole 125 in the bottom of travel block 115.

Figure 5:
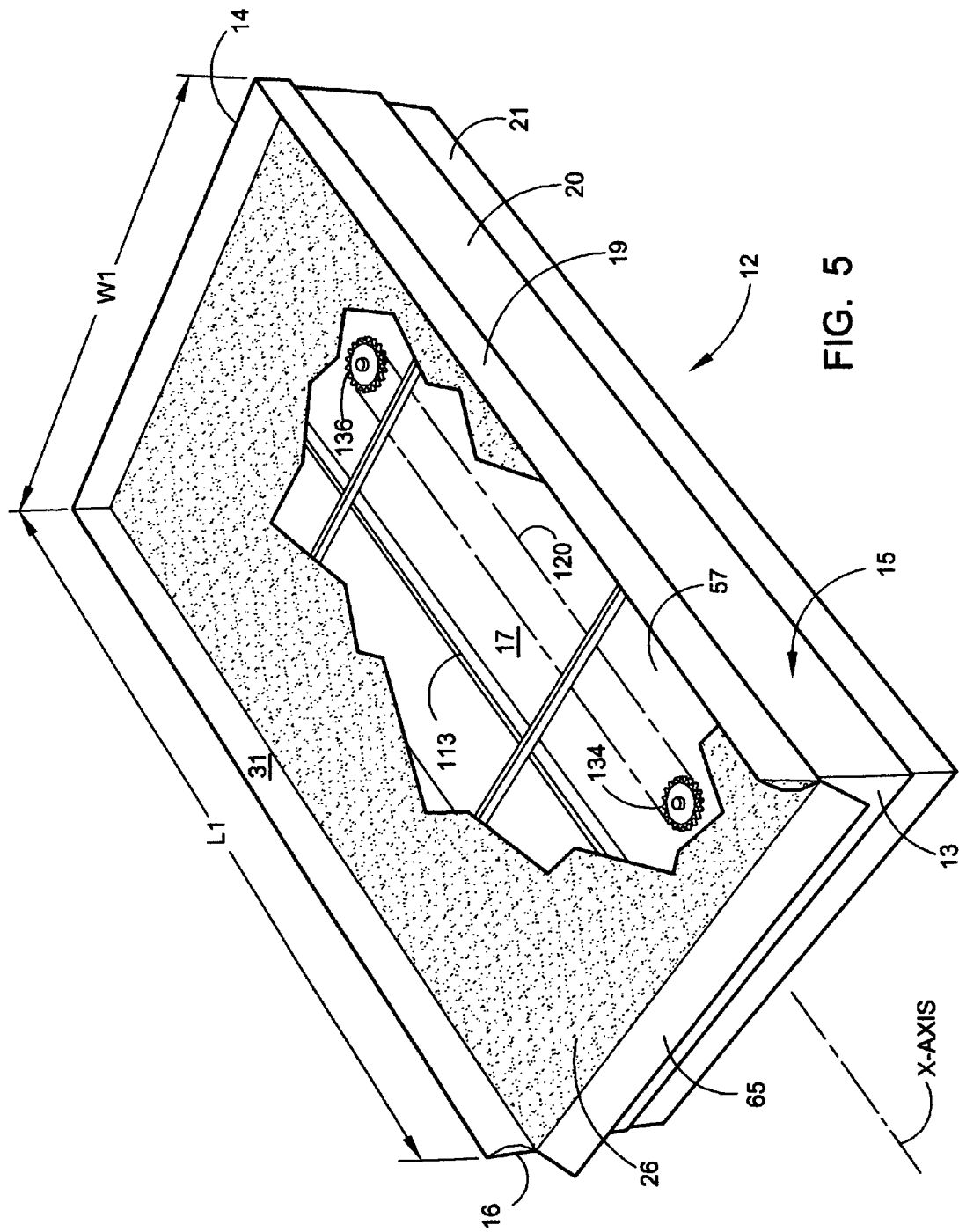
FIG. 5 is an enlarged front perspective view of the elongated housing showing portions of the screen broken away and certain structure removed to show the drive system for the spray assembly.

Referring to FIG. 5, it will be seen that chain 120 passes around sprocket gear 132 and sprocket gear 134. Sprocket gear 132 has a drive shaft 136 that extends upwardly from gear box 137. A motor 138 provides the power for rotating drive shaft 136. Sprocket gear 134 is mounted on an idler shaft 140.

Referring to FIGS. 6 and 8, it will be understood that as chain 120 approaches sprocket gear 134, chain connector 121 will pass around the perimeter of sprocket gear 134 and while this is happening, travel block 115 will travel along slot 106 in the guide track assembly 102. Chain connector 120 of the drive chain 120 will continue along its path to drive sprocket 132. As chain connector 121 passes around the outer perimeter of drive sprocket 132, travel block 115 will be forced to return along slot 106 to its original position. This allows the chain 120 to travel in a continuous closed loop path. On the upward travel of spray assembly 69, the knife like spray of water coming from spray nozzles 80 will force particles in the screen upwardly out of the apertures in the screen and on the return travel of spray assembly 69, the accumulated waste particles will travel downwardly along screen 26 and be deposited in container 67.

During operation, if chain 120 becomes loose or it is necessary to replace or fix chain 120, there is structure for loosening the tension and tightening the tension on chain 120. This structure is illustrated in FIG. 7. Idler shaft 140 passes downwardly through sprocket gear 134, bearing block 150, a sheet or plate of UHMW material 152, slot in bottom wall 117 of the housing 12, another pad of UHMW material 154 and finally through bearing block 156. Bottom wall 17 also has four slots 160. Bolts 163 pass through the aligned apertures of the respective components and also pass through slots 160 and have nuts tightened on to their bottom ends. When the nuts 64 are loosened, the tension on the chain 120 can be adjusted by pulling sprocket gear 134 rearwardly or forwardly. Once the chain is tightened, the nuts 164 would be tightened down to secured the assembly in a fixed positioned.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various components described above may be altered, all without departing from the spirit or scope of the invention as defined in the appended Claims.

What is claimed:

1. A liquid/solids waste separator comprising:

A longitudinally extending elongated housing having a front wall, a rear wall, a left side wall having an inner surface, a right side wall having and inner surface, a bottom wall having a front end and a rear end, and a longitudinally extending X-axis;

support means for supporting said housing with said rear end of said bottom wall positioned vertically higher than said front end of said bottom wall;

an elongated mesh screen having a width W1 and a length L1 for separating solid waste particles from effluent while allowing the filtered liquid portion of the effluent to pass downwardly through said mesh screen, said mesh screen having apertures across said width and said length;

means for supporting said elongated mesh screen in said housing at a predetermined height above said bottom wall of said housing;

spray means positioned below said elongated mesh screen that directs a spray of liquid against said bottom surface of said mesh screen to unclog any apertures in said mesh screen that have become clogged;

drive means for reciprocally driving said spray means longitudinally forwardly and rearwardly within said elongated housing; said drive means comprises a motor that drives a chain passing around longitudinally spaced sprocket gears mounted in said housing; and means for connecting said spray means to a fluid source; and further wherein said spray means comprises a plurality of laterally spaced spray nozzles connected to a transversely extending manifold tube having a left end and a right end;

said sprocket gears are mounted on shafts having Z-axes that extend upwardly at a 90 degree angle from said bottom wall and said chain travels in a horizontal place above said bottom wall;

said drive means further comprises a drive peg extending vertically from said chain that is secured to a travel block mounted in a transversely oriented guide track assembly; and further comprising an alignment bearing block connecting to the top surface of said travel block; said travel block having a horizontally oriented bore hole that reciprocally slides over said manifold tube; and a tracking rail extending between said front wall and rear wall; a pair of laterally spaced tracking plates engage the opposite sideways of said tracking rail and slide therealong; support means extending upwardly from said guide track assembly.

2. A liquid/solids waste separator as recited in claim 1 wherein said housing is tilted at an angle A and A is in the range of 25-50 degrees.

3. A liquid/solids waste separator as recited in claim 1 wherein said mesh screen has a rectangular perimeter.

4. A liquid/solids waste separator as recited in claim 3 wherein W1 is in the range of 16-72 inches.

5. A liquid/solids waste separator as recited in claim 4 wherein L1 is in the range of 4-10 feet.

6. A liquid/solids waste separator as recited in claim 1 wherein said mesh screen is marketed as 200 mesh stainless steel.

7. A liquid/solids waste separator as recited in claim 1 wherein said bottom surface of said mesh screen is in communication with an area in said housing that forms a collection chamber for filtered liquid separated from the effluent.

8. A liquid/solids waste separator as recited in claim 7 wherein said means for connecting said spray means to a fluid source comprises a pump and fluid conduit connecting said fluid source to said spray means.

9. A liquid/solids waste separator as recited in claim 8 wherein said fluid source is filtered liquid from said collection chamber.

10. A liquid/solids waste separator as recited in claim 1 wherein said support means comprises a pair of support legs detachably secured to said housing.

11. A liquid/solids waste separator as recited in claim 1 further comprising an effluent overflow tank having structure for spreading the overflow of the effluent across the entire width of said mesh screen.

12. A liquid/solids waste separator as recited in claim 1 further comprising adjustment means for adjusting the tension on said chain.

13. A liquid/solids waste separator as recited in claim 1 wherein said spray nozzles have apertures that produces a water knife spray across the width of said mesh screen.

14. A liquid/solids waste separator as recited in claim 1 wherein there is a slide block wall and a track on said inner surface of said right side wall that allows said manifold tube to reciprocally to travel beneath most of the length of said mesh screen.

15. A liquid/solids waste separator as recited in claim 1 comprising means for rotating said manifold tube for adjusting the angle said spray nozzles are oriented toward said bottom surface of said mesh screen.

\* \* \* \* \*